US006938938B2

United States Patent
Risle et al.

(10) Patent No.: US 6,938,938 B2
(45) Date of Patent: Sep. 6, 2005

(54) FLUID OPERATED GRIPPER

(75) Inventors: Andreas Risle, Esslingen (DE); Jürgen Stingel, Stuttgart (DE)

(73) Assignee: Festo AG & Co., Esslingen (DE)

( * ) Notice: Subject to any disclaimer, the term of this patent is extended or adjusted under 35 U.S.C. 154(b) by 207 days.

(21) Appl. No.: 10/395,504

(22) Filed: Mar. 24, 2003

(65) Prior Publication Data

US 2003/0189349 A1 Oct. 9, 2003

(30) Foreign Application Priority Data

Apr. 5, 2002 (EP) .............................. 02007685

(51) Int. Cl.⁷ ................................ B25J 9/20
(52) U.S. Cl. ..................... 294/88; 294/119.1; 901/37
(58) Field of Search .................. 294/119.1, 907, 294/88; 901/37

(56) References Cited

U.S. PATENT DOCUMENTS

| | | | | |
|---|---|---|---|---|
| 4,611,846 A | * | 9/1986 | Feiber et al. | 294/88 |
| 4,783,106 A | * | 11/1988 | Nutter | 294/88 |
| 4,784,421 A | * | 11/1988 | Alvite' | 294/86.4 |
| 4,907,834 A | * | 3/1990 | dejong et al. | 294/88 |
| 5,163,729 A | * | 11/1992 | Borcea et al. | 294/119.1 |
| 6,390,751 B2 | * | 5/2002 | Jordan et al. | 414/21 |
| 6,598,918 B1 | * | 7/2003 | Null et al. | 294/88 |

FOREIGN PATENT DOCUMENTS

| | | |
|---|---|---|
| DE | 3932532 A1 | 4/1991 |
| GB | 2041262 A1 | 9/1980 |
| JP | 51111578 A | 10/1976 |
| RO | 101596 A | 11/1991 |

OTHER PUBLICATIONS

W. Backe, et al., "Programmierbare Greifer mit servopneumatischen Antrieben", *Robotersysteme*, vol. 5, No. 1, pp. 57–64 (1989).

* cited by examiner

*Primary Examiner*—Dean Kramer
*Assistant Examiner*—Esther O. Okezie
(74) *Attorney, Agent, or Firm*—Hoffmann & Baron, LLP

(57) ABSTRACT

A fluid power operate gripper has a housing, in which a drive space is located, which contains at least two drive pistons connected or able to be connected with a respective gripping element. The drive pistons divide up the drive space into a plurality of actuating chambers, which are subject to an actuating fluid under the control of control means in a controlled mutually matching manner. Since the drive pistons are not mechanically coupled kinematically variable operation is made possible in this manner.

25 Claims, 3 Drawing Sheets

FLUID OPERATED GRIPPER

BACKGROUND OF THE INVENTION

The invention relates to a fluid operated gripper comprising a housing, in which a drive space is located, in which space at least two drive pistons are arranged in sequence, such pistons being respectively connected or being able to be connected with a gripping element, said pistons being able to be shifted and positioned in the direction of their sequence in relation to the housing and in relation to one another, said pistons dividing up the working space into two outer actuating chambers respectively only delimited by one drive piston and furthermore into at least one inner actuating chamber delimited simultaneously by directly following drive pistons.

THE PRIOR ART

A fluid power gripper disclosed in the European patent publication 0997237 A1 possesses a housing having an elongated drive space, wherein two drive pistons are arranged, which may be respectively connected with a gripping element. During fluid action in the inner actuating chamber placed between them the two drive pistons are moved away from each other, and are moved toward each other when the two outer actuating chambers are simultaneously subjected to fluid action they are moved toward each other. It is in this manner that an opening or closing movement of the gripping elements can be produced, a synchronizing means kinematically coupling the two drive pistons causing a movement, which is always equal, of the two drive pistons and accordingly of the gripping elements.

The constantly increasingly exacting requirements to be met in modern automation technology demand improved system properties while at the same time providing for increased flexibility and a large range of application possibilities. In order to produce complex handling equipment or robots and accordingly to implement handling operations grippers are required which may be adaptably employed with a high degree of precision. These requirements are not always fully met by the known type of grippers.

SHORT SUMMARY OF THE INVENTION

One object of the invention is accordingly to provide a fluid power gripper which possesses extremely flexible possibilities of application.

In order to achieve these and/or other objects appearing from the present specification, claims and drawings, the present invention provides a fluid power gripper of the type initially mentioned, wherein in order to permit mutually independent movement the drive pistons are not mechanically kinematically ganged together, the individual actuating chambers being provided for mutually matching fluid action controlled by control means.

Since there is no mechanical positive coupling between the drive pistons, the controlled mutually matching fluid action in the individual actuating chambers leads to an extremely flexible and adjustable shifting and/or positioning of the individual drive pistons and of the associated gripping elements. Using suitable control the drive pistons and accordingly the gripping elements may be individually moved. In the case of need different speeds of motion of the drive pistons may be set for or it is possible to set adjustable or variable gripper positions not centered on a middle position of the gripping elements. Given a suitable design manners of operation are even possible in which the gripping elements for taking hold of an object are firstly shifted in mutually opposite directions in order, and following this, it is possible to shift the object gripped by performing a simultaneous shifting movement, in the same direction, of the gripping elements. Accordingly it is even possible in some cases to save having an additional handling unit, which so far has been necessary, because for shifting a gripped object the entire gripper must be shifted.

Further advantageous developments of the invention are defined in the claims.

For the majority of applications it is sufficient and also advantageous for just two drive pistons to be arranged in the drive space. However, there is a possibility, more especially for tackling particularly complex tasks, to accommodate more than two drive pistons jointly in the drive space, each then having its own gripping element. By providing for correspondingly matched fluid action in the individual actuating chambers it is always possible for each drive piston to be shifted and/or positioned in the desired fashion without this affecting the position or the type of motion of the other drive pistons.

For controlled fluid action on the individual actuating chambers the control means are preferably provided with control valve means, which permit an individual control of the fluid supply and removal of fluid with respect to the individual actuating chambers. The control valve means are preferably of the continuous function type. Alternatively switching valves are possible, preferably with pulse width modulation control.

It is furthermore an advantage if the control means comprise sensor means for detecting control related operation parameters in order to achieve an extremely exact shifting and positioning of the individual drive pistons or, respectively, gripping elements.

Using pressure sensor means the pressures obtaining in the individual actuating chambers may be found in order, on the basis thereof, to get suitable control of control means enabling varying the fluid supply and fluid removal with respect to the individual actuating chambers.

By using position sensor means the position of the individual drive pistons or gripping elements may be detected. A particularly exact operational behavior may be obtained by the use of at least one displacement measuring system, which can find each instantaneous position of the individual drive pistons.

The force measuring sensor means render it possible to apply exactly predetermined forces by the gripping elements operated by the drive pistons.

It is convenient for the control means to comprise an electronic control means which on the basis of sensor signals received and taking into account preset target information as regards operational behavior, performs control for influencing the fluid supply and fluid removal with respect to control valve means serving the actuating chambers. The electronic control means may be designed for realizing a regulated manner of operation.

The fluid supply and fluid removal to and from the actuating chambers may in each case be through fluid duct openings in the housing. For this purpose, using suitable abutments or, preferably, using positioning sensor means, prefeerably steps are taken to ensure that the drive pistons are not able to move past or over the various fluid duct openings in the housing.

It is however looked upon as being particularly advantageous for fluid supply and fluid removal as regards the inner actuating chambers delimited by the two drive pistons placed in sequence to take place by way of fluid duct openings, which are formed on at least one of the respective drive pistons and at all times participate in its motion. The actuating chambers on the outside and only delimited by one drive piston may be correspondingly controlled or however controlled using fluid duct openings in the housing.

Owing to the duct openings which are moved as well there is, among other things, the useful possibility of so operating the drive pistons that their possible displacements overlap. Accordingly there is for example the possibility of positioning each drive piston at practically any desired point along the drive space, if assuming such position is not obstructed by an adjacent drive piston.

On the basis of the gripper in accordance with the invention it is possible for different types of gripper to be realized, as for example grippers having gripping elements pivoting or only moving in translation during operation. Particularly advantageous is a design in the form of parallel grippers.

Further advantageous developments and convenient forms of the invention will be understood from the following detailed descriptive disclosure of embodiments thereof in conjunction with the accompanying drawings.

LIST OF THE SEVERAL VIEWS OF THE FIGURES

DETAILED ACCOUNT OF WORKING EMBODIMENTS OF THE INVENTION

Figure 1:
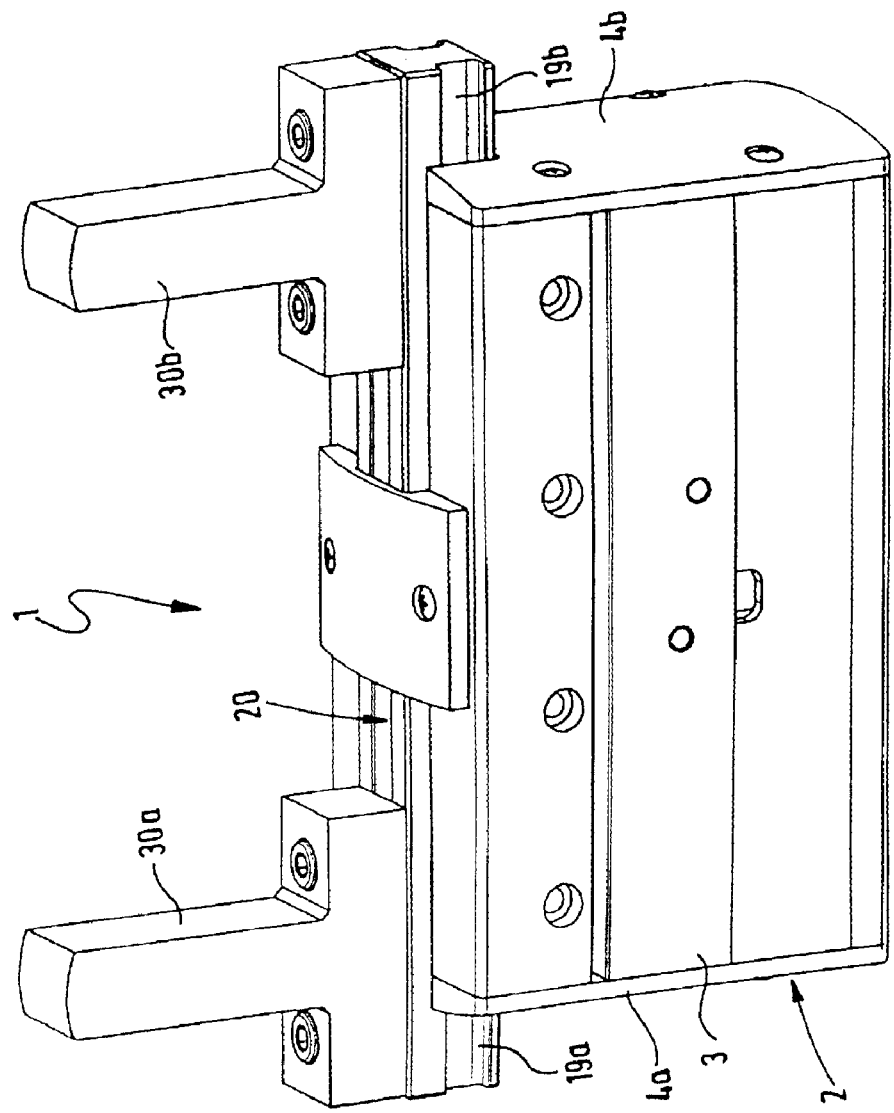
FIG. 1 shows a preferred design of the gripper of the invention in a perspective elevation.

The grippers illustrated in the drawings are more especially designed for operation with compressed air as an actuating fluid. However operation with a hydraulic medium is possible as well.

The fluid operated grippers generally referenced 1 in the drawing each comprise a gripper unit 2 with, for example, a rectangular block-like housing 3.

The housing 3 defines in its interior a linearly extending drive space 4 between two terminal walls 4a and 4b. In the drive space 4 a plurality of drive pistons 5 are arranged in sequence. In the working embodiment just two drive pistons 5 are provided. The direction of the sequence is indicated in chained lines 6. It coincides with a longitudinal axis of the drive space 4.

On their outer periphery the drive pistons 5 are provided with sealing means 31, to be explained later, by way of which they cooperate with the peripheral limiting wall 7 of the drive space 4 in a sealing manner. The delimiting wall 7 extends between the two terminal walls 4a and 4b and in the working example is a component of a tubular center member 9, which is placed between the terminal walls 4a and 4b, which are like covers in structure.

The drive pistons 5 are able to be shifted and positioned in the direction of their sequence 6—in the following referred to as the "shift direction"—independently from each other both in relation to housing 3 and also in relation to one another. The individual shift movements are indicated at 11 by double arrows. Since the drive pistons 5 are furthermore not in any way mechanically coupled with each other—more particularly there is no mechanical synchronization of the movements of the two pistons—there is in fact the possibility of shifting each drive piston 5 independently of the other drive piston 5 in the shift direction 6 and to position it. The only limitation with respect to this motion behavior is the abutment of the drive pistons 5 against the terminal walls 4a and 4b or against an adjacent drive piston 5.

Owing to the presence of the drive pistons 5 the drive space 4, which is continuous from one terminal wall to the other terminal wall, is divided up into a plurality of actuating chambers 12 in a fluid-tight fashion. There are two outer actuating chambers 12a each being between one of the drive pistons 5 and a terminal wall 4a and 4b respectively adjacent to it. Furthermore the respectively directly following drive pistons 5 jointly define an actuating chamber 12, lying between them, which will be termed the inner actuating chamber 12b.

In the working examples in the common drive space 4 there are two drive pistons 5. This means that there are in all three actuating chambers, that is to say the two outer actuating chambers 12a and furthermore an inner actuating chamber 12. In the case of a larger number of drive pistons 5 there will be a larger number of inner actuating chambers 12b accordingly. In accordance with the linear extent of the drive space 4 the shift direction 6 of the drive pistons 5 is also linear.

Figure 2:
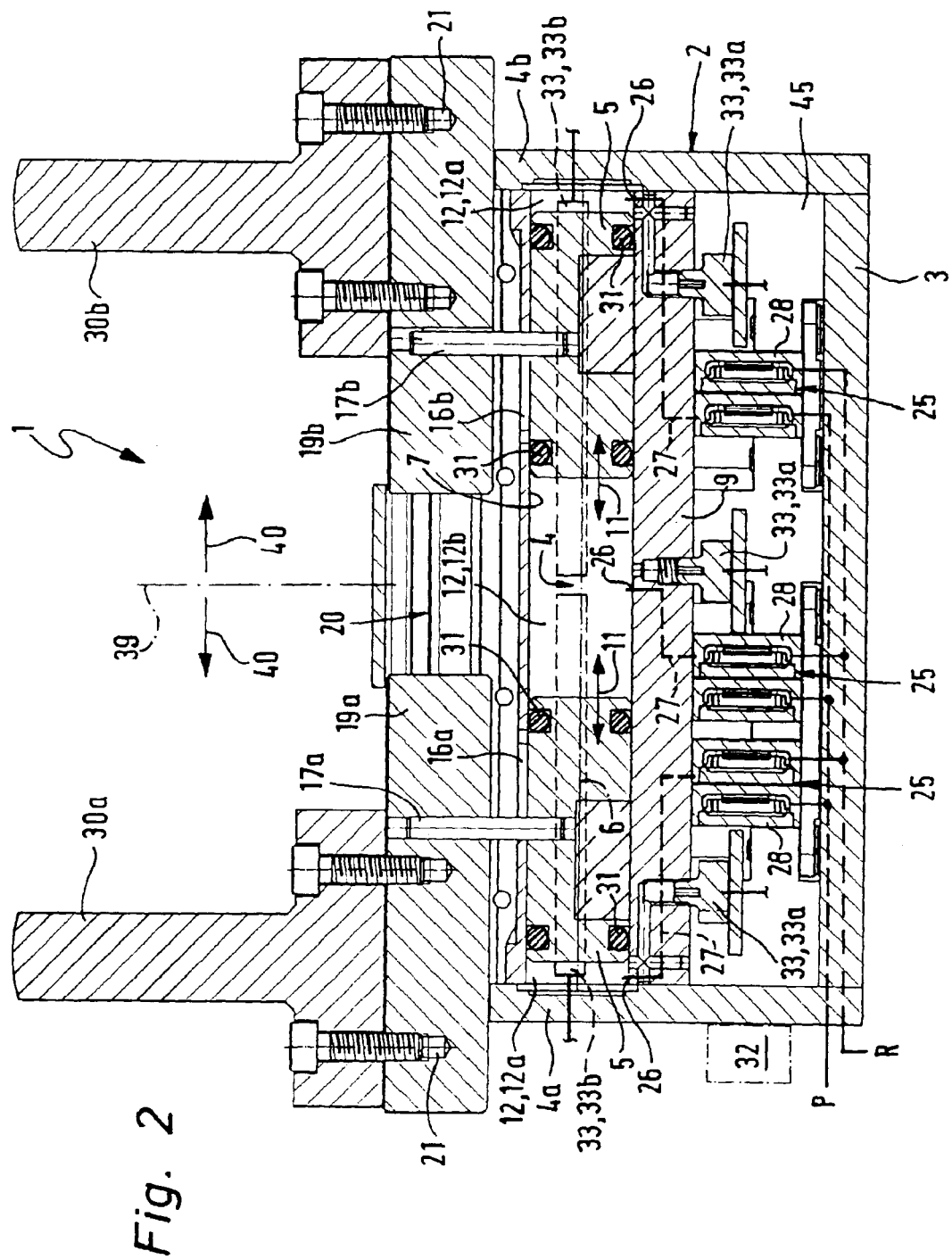
FIG. 2 shows the gripper of FIG. 1 in a longitudinal section.
Figure 3:
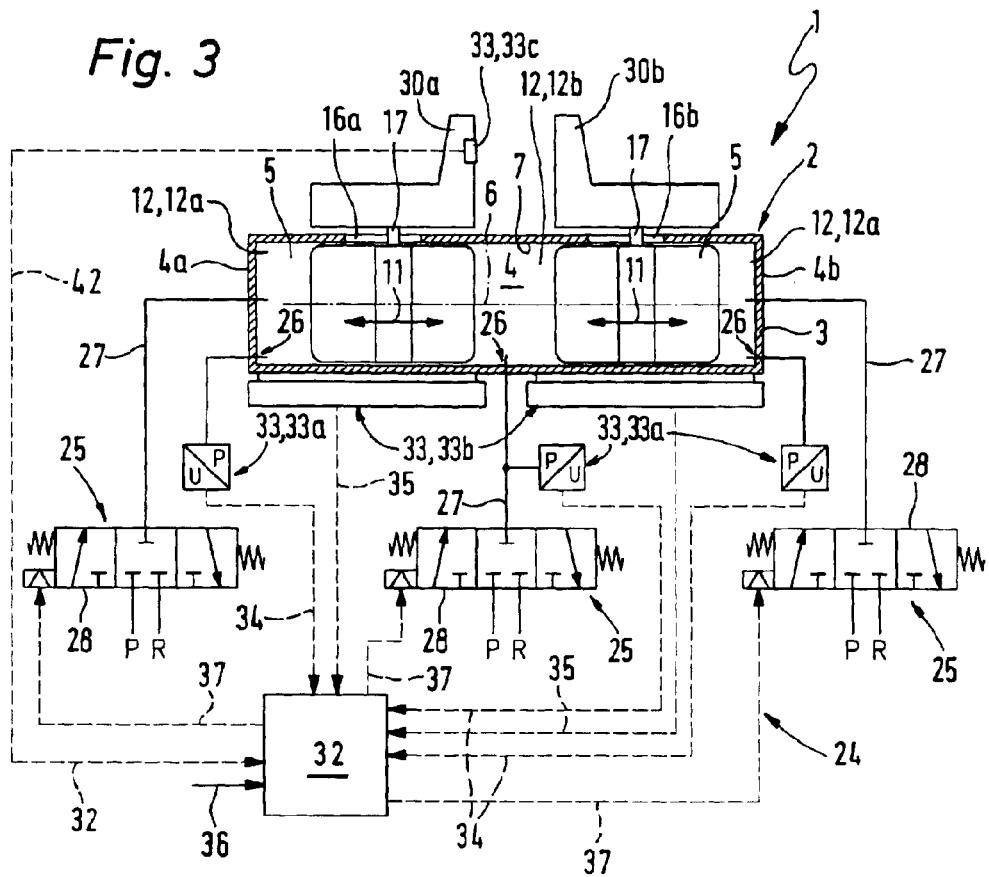
FIG. 3 is a view of the gripper of FIGS. 1 and 2 including a preferred design having control means.

In the working embodiment illustrated in FIGS. 1 through 3 the housing 3 is provided in the peripheral area of the two drive pistons respectively with an elongated slot 16a and 16b extending in the direction 6 of shift. Such slot opens on the one hand radially to the inside into the drive space 4 and radially to the outside at the outer face of the housing 1.

Each of the two axially spaced longitudinal slots 16a and 16b has a drive dog 17a and 17b or runner extending through it, which produces an entraining connection between the respectively associated drive piston 5 and one of two gripping element carriers 19a and 19b arranged on the outside of the housing 3. The drive dogs 17a and 17b are in the working example designed in the form of pins, the inner terminal parts being securely attached in recesses in the drive pistons 5 while their outer terminal parts are attached in recesses in the gripping element carriers 19a and 19b, for example by a press fit.

The two gripping element carriers 19a and 19b are respectively arranged alongside one of the drive pistons 5 and are preferably held for sliding movement by way of a linear guide means 20 parallel to the shift direction 6 on the housing 1. The design of the linear guide means 20 may be more particularly the same as that in the said European patent publication 0997237 A1 so that for simplification attention is called to the disclosure thereof.

Each gripping element carrier 19a and 19b is provided with attachment means 21, for example in the form of threaded holes, which render possible replaceable or detachable attachment of gripping elements 30a and 30b. In the case of the gripping element 30a and 30b it will normally be a question of gripping jaws.

It would also be possible to couple the gripping elements 30a and 30b with the pistons 5 for drive transmission without the intermediate placing of separate gripping element carriers 19a and 19b.

Each drive piston 5 bears two annular seals 31 arranged coaxially with an axial distance apart, same being so placed that the respectively associated longitudinal slot 16a and 16b will be between the two seals 31 in every possible axial position of the respective drive piston 5. This means that independently from the position of the drive pistons 5 no drive fluid is able to escape through the longitudinal slots 16a and 16b.

Figure 4:
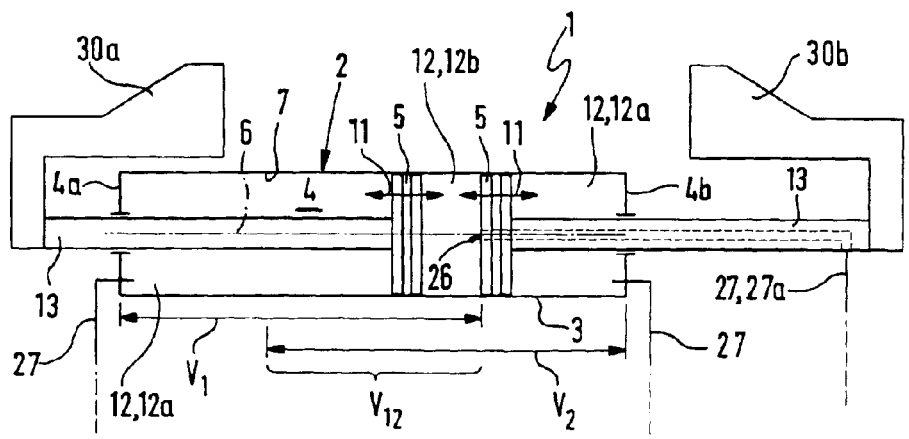
FIG. 4 is a highly diagrammatic view of a further embodiment of the fluid operated gripper.

In the case of the design of FIG. 4 the drive connection of the gripping elements 30a and 30b with the respectively associated drive piston 5 is in a modified form. At this point a piston rod 13 is connected with each drive piston 5, such rod extending through the respectively associated terminal wall 4a and 4b out of the housing 3 in a sealed manner. The piston rods 13 point in mutually opposite directions. On sections lying outside the housing 3 of each piston rod 13 one of the gripping elements 30a and 30b is arranged directly or with a element carrier in between. As in the case of the design in accordance with FIGS. 1 through 3 the gripping elements 30a and 30b protrude at a right angle to the shift direction 6 to the same side so that they are opposite to one another in the shift direction 6. If the drive pistons 5 are moved toward or away from each other, then the distance between the gripping elements 30a and 30b is correspondingly increased or reduced.

The shift movements 11 of the drive pistons 5 are produced by fluid action in the actuating chambers 12. Then there is a change in the length of at least 2 or of all three actuating chambers dependent of the control. The transmission of the shift movements to the gripping elements 30a and 30b takes place by the intermediary of the dogs 17a and 17b or of the piston rods 13.

The fluid operated grippers 1 are respectively fitted with control means, which are generally referenced 24 and have a structure and manner of operation which are best explained in connection with FIG. 3. The control means 24 render possible a predetermined mutually matched fluid action in the individual actuating chambers 12.

The control means 24 include control valve means 25, using which the supply and removal of fluid with respect to the individual actuating chambers 12 may be individually controlled.

Into each actuating chamber 12 there opens the part of a fluid duct 27 which is connected with a control valve 28 of the control valve means 25. Using electrical control signals, which are able to be supplied to the respective control valves 28 by an electronic control means 32 by way of electric control lines 37, it is possible for the control valves 28 to be operated individually in a mutually matching manner in order to control the fluid action on the actuating chamber 12, which is respectively connected to same.

For this purpose the fluid ducts 27 in all working examples can be connected selectively with a pressure source P or with a pressure sink R, the latter being, dependent on the type of actuating fluid, the atmosphere or a tank. Furthermore, there is preferably also the possibility of completely closing the respective fluid line.

In the working embodiments the control valves 28—preferably each actuating chamber 12 has its own control valve 28—are in the form of continuous action valves and in the position of providing adjustable flow cross sections, that is to say intermediate settings as well between the open position and the closed position. Accordingly the control valve means 25 may be termed continuous control valve means. However, the use of switching valves would also be possible, preferably with pulse width modulation control.

Using the control valve means 25 it is possible for the fluid pressures obtaining in the actuating chambers 12 to be individually and independently predetermined to any desired value or regulated into a desired value. It is in this manner that there is the possibility of shifting and positioning each drive piston 5 individually without influencing the other drive piston or pistons.

By suitably controlled fluid action in the actuating chambers 12 it is possible to provide for exactly matched movement behavior of the drive pistons 5 and accordingly of the gripping elements 30a and 30b coupled with them kinematically. Thus for example firstly a relative movement of the drive piston 5 may be produced for the purpose of gripping an object using the gripping elements 30a and 30b in order to then, for shifting the gripped object, to shift both drive pistons 5 simultaneously and in equal displacements.

In order to grip an object the two drive pistons 5 may for instance firstly be moved in opposite directions toward each other until an object located between the two gripping elements 30a and 30b is gripped. After such gripping the two drive pistons may be shifted simultaneously at the same rate in the same direction in order to shift the gripped object through desired displacement.

It is in this manner that the fluid operated gripper—in the working example it is designed in the form of a parallel gripper—is able to exhibit not only the functionality of a gripper but also the functionality of a linear drive or a linear drive adapted for materials handling. In this case there is the possibility of having a suitably large overall length of the drive space 4 to obtain a relatively large shift displacement of the gripping elements and accordingly of the object gripped.

In the case of materials handling it has so far been normal to attach a gripper to the linear drive, the gripper then engaging an object so that, using the linear drive, the entire gripper including the held object may be shifted into position. With the design in accordance with the invention it is in many cases possible to do without such a separate linear drive, because the shifting function is performed by the drive piston 5. It is in this manner that the structure is substantially simplified and it is also possible to achieve extremely high shifting speeds, because the mass to be shifted are relatively small.

It will be clear that in the case of relatively large shift ranges of the drive pistons 5 and correspondingly large lengths of the longitudinal slots 16a and 16b it will be convenient to have other sealing means for the longitudinal slots than those described above. Preferably use will be made of sealing systems conventional for so-called slotted cylinder, in the case of which the longitudinal slot is sealed off by a sealing band or tape. Such a possible design is described in the U.S. Pat. No. 5,469,775.

In order in the case of the designs in accordance with FIGS. 1 through 3 for example to shift the left drive piston 5, the fluid pressure in the left hand outer actuating chamber 12a may be increased or reduced, whereas the pressure in the inner actuating chamber 12b and in the outer right actuating chamber 12a is kept constant in order to hold the right hand drive piston 5 in the position assumed without any motion. In order to move the left hand drive piston 5 it would be also to keep the fluid pressure in the left hand outer actuating chamber 12a constant whereas the pressures in the inner actuating chamber 12b and in the right hand outer actuating chamber 12a are increased or reduced together and by the same amount. Using similar control it is possible furthermore for only the right hand drive piston 5 to be shifted with the left hand drive piston 5 immobilized or there is the possibility of shifting the two drive pistons 5 in any desired manner in relation to each other and to position them.

It will be clear that owing to the variable control the position, at which an object may be gripped, is not limited to a certain position relative to the housing. Admittedly there is still the possibility, as with standard grippers, of placing the grip position in the middle in relation to the length of the drive space 4, as is indicated in chained lines at 39. It is readily possible however for this grip position to be displaced to either side as indicated by the arrows 40. It is in this manner that objects may be gripped in changing grip positions without for this purpose having to shift the position of the housing 3 of the gripper 1.

In order to ensure a highly exact manner of functioning it is an advantage for the control means 24 to have sensor means 23 using which operational parameters of the gripper relevant for control may be sensed, which are then evaluated by the electronic control means 32 and are taken into account for the control of the control valve means 25.

In this connection in the working examples inter alia pressure sensor means 33a are employed, with which the instantaneous fluid pressures obtaining in the individual actuating chambers 12 may be detected. As pressure sensor means 33a more particularly commercially available pressure sensors are utilized. In the working example they are either connected with the fluid ducts 27 leading to the actuating chambers 12 or directly with the respective actuating chamber 12 itself.

The pressure sensor means 33a produce an electrical pressure signal on the basis of the fluid pressure obtaining, such signal being transmitted to the electronic control means 32 by way of control line 34 to be processed in the means 32.

Furthermore sensor means 33 in the form of position sensor means 33b are present, using which the current position of the individual drive pistons 5 and/or gripping elements 30a and 30b may be detected. These position sensor means 33b are preferably in the form of one or more displacement measuring systems, which can detect or sense the current position. Position detection takes place more particularly using sensor means without making physical contact, for instance with the use of sensor means with a magnetostrictive principle of operation. A mechanical detection of position, for instance with a wiping contact, and possibly, using a resistance measuring device, is also possible.

For position detection it is possible for the individual drive pistons 5, as illustrated, to be individually provided with separate position sensor means. However, there is also the possibility of using one and the same position sensor means for common position detection in the case of all drive pistons 5.

The position sensor means 33b produce an electronic position signal, which is transmitted by way of suitable control lines 35 to the electronic control means 32 to be processed in it.

Accordingly the electronic control means 32 can so operate the control valve means 25 by way of control lines 37 that they set the fluid pressures in the actuating chambers 12 to cause the drive pistons 5 to perform the desired shift movement to be positioned in the desired fashion. In this case the positions of the individual drive pistons 5 are so taken into account that undesired collisions between pistons are prevented.

In case of need the control means 28 may also comprise force sensor means 33c, which are preferably arranged on one element or on both gripping elements 30a and 30b and which are in a position of finding the gripping force exerted on the object to be handled. The electronic grip force signals resulting from this may be transmitted by way of control lines 42 to the electronic control means 32 as well.

The desired operational behavior may also be individually set for the electronic control means 32 on the basis of suitable target information, something which is indicated in the drawing by the arrow 36. If the electronic control means 32 has regulating means, it is possible in this manner to produce an electronically regulated mode of operation by using the deviation between the target information or data and the true information or data.

The operational events of the drive device 1 can be stored in the electronic control means 32 using a storage program. More particularly, it may be a question of a memory programmable control means.

In the case of the working example of FIGS. 1 through 3 the fluid duct openings 26 for the supply and removal of the actuating fluid are exclusively arranged in the housing. They open at a suitable position in the wall delimiting the drive space 4 and into the respective actuating chamber 12. Such a design is relatively simple to realize and is suitable more particularly in cases, in which the possible ranges of movement of the drive pistons 5 do not have to overlap. Each drive piston 5 has in this case its own shift range, into which the other drive piston 5 does not move. The limits of shift are at that axial position, at which the fluid duct openings 26 are placed. Undesired movement of the drive pistons 5 over or past such fluid duct openings may be prevented using the position sensor means 33b without any difficulty. As an alternative or in addition it is moreover possible mechanical displacement limiting abutments fixed to the housing could be provided.

However, designs are certainly possible, in the case of which the possible displacements of the drive pistons 5 in the shift direction 6 overlap. In FIG. 4 a working example of this is illustrated. Here the two shift ranges $V_1$ and $V_2$ of the two drive pistons 5 will be seen, which overlap in a middle range $V_{12}$. Each of the two drive pistons 5 may be shifted into the overlap range $V_{12}$ if it is not prevented from so doing by the respective other drive piston. The length of the overlap range V12 is able to be set by the specific design and it may even extend at least approximately over the entire length of the drive space 4. Such a design means that it is possible that the position, at which an object to be handled may be gripped, may be varied within wide limits.

In order to enhance this possibility at least that fluid duct opening 26, which is for producing pressure in the inner actuating chamber 12, is not stationary on the housing but is on one of the drive pistons 5 delimiting the inner actuating chamber 12b. The fluid duct opening 26 accordingly moves synchronized with the corresponding drive piston 5 so that at the periphery of the drive space 4 no fluid duct openings 26 are required, which would limit the range of shift.

In order to ensure the mobility of the drive pistons 5 it is possible for the fluid line leading to the entrained fluid duct opening 26 to be at least in part a component of a flexible fluid pipe 27a.

In the working embodiment illustrated in FIG. 4 the supply of fluid for the inner actuating chamber 12b takes place through one of the piston rods 13, which has the associated fluid duct 27 running through it. In the case of the design of FIGS. 1 through 3 the supply of fluid may take place without any difficulty to a fluid duct opening arranged on one drive piston 5 through the associated dog 17a and 17b, respectively.

In principle it is possible for the supply of fluid into all actuating chambers 12 to take place by way of the drive pistons 5. It would for example be possible to provide fluid duct openings leading to actuating chambers on opposite axial side on one and the same drive piston 5. In order to reduce the mechanical complexity it is however in any case considered to be an advantage to have recourse to fluid action at least in the outer actuating chambers 12a by means of fluid duct openings in the housing.

In the case of all working examples the control means 24 may be at least partly arranged in or on the housing 3 of the fluid powered gripper. In the case of the working embodiment of FIGS. 1 through 3 the control valve means 25 are protected in a receiving space 45, shielded off from the outside, in the housing 3. The receiving space 45 is preferably arranged alongside the drive space 4.

The pressure sensor means 33a and the position sensor means 33b are as well attached to the housing 3.

The electronic control means 32 can also be selectively arranged externally or—as illustrated in FIG. 2 in chained lines—directly on the gripper unit 2.

The complete fitting of the gripper unit 2 with the control means 24 and the sensor means 33 renders possible the production of a highly integrated gripper, on which only the lines necessary for fluid and electrical supply must be connected in order to put it into a condition ready for operation.

What is claimed is:

1. A fluid operated gripper comprising:
    a housing defining, a drive space; and
    at least two drive pistons being arranged in sequence within the drive space, the at least two drive pistons being connectable with a gripping element, the pistons being able to be shifted and positioned in the direction of their sequence in relation to the housing and in relation to one another, the at least two drive pistons dividing up the drive space into two outer actuating chambers, each outer actuating chamber delimited by one of the at least two drive pistons, and furthermore into at least one inner actuating chamber delimited simultaneously by adjacent drive pistons, the at least two drive pistons are not mechanically connected, the individual inner and outer actuating chambers being provided for mutually matching fluid action controlled by control means, and wherein the at least two drive pistons are movable independent of each other by the control means.

2. The gripper as set forth in claim 1, comprising two drive pistons in the common drive space.

3. The gripper as set forth in claim 1, wherein the control means possess control valve means by which fluid supply and fluid removal is able to be individually controlled with respect to each actuating chamber.

4. The gripper as set forth in claim 3, wherein the control valve means is designed in the form of continuous action control valve means or as pulse width modulated switching valve means.

5. The gripper as set forth in claim 1, wherein the control means includes sensor means for the detection of control related operational parameters.

6. The gripper as set forth in claim 1, wherein the control means possesses pressure sensor means for the detection of pressures obtained in the individual actuating chambers.

7. The gripper as set forth in claim 6, wherein the pressure sensor means are connected by way of fluid ducts leading to the actuating chambers or are directly connected with the actuating chambers.

8. The gripper as set forth in claim 1, wherein the control means include position sensor means for the detection of the position of the individual drive pistons.

9. The gripper as set forth in claim 8, wherein the position sensor means comprise at least one displacement measuring system.

10. The gripper as set forth in claim 1, wherein the control means include force sensor means for the detection of the gripping force of the gripping elements.

11. The gripper as set forth in claim 1, further including a control valve means for influencing the fluid supply and fluid removal with respect to the actuating chambers, and wherein the control means include an electronic control means, which based on input sensor signals and predetermined target information for operational behavior, controls the control valve means.

12. The gripper as set forth in claim 11, wherein the electronic control means possesses regulating means to produce a regulated operational behavior of the gripper.

13. The gripper as set forth in claim 1, wherein for fluid supply and fluid removal with respect to one or more actuating chambers in each case at least one fluid duct opening in the housing opens into the respective actuating chamber.

14. The gripper as set forth in claim 13, wherein the fluid supply and removal with respect to all actuating chambers takes place through fluid duct openings in the housing.

15. The gripper as set forth in claim 1, wherein for the fluid supply and removal for the at least one inner actuating chamber, on at least one of the drive pistons delimiting the actuating chamber, a fluid duct opening is provided moving with the drive piston and directed into the actuating chamber.

16. The gripper as set forth in claim 1, wherein the range of shift of at least two directly sequentially adjacent drive pistons overlap in the direction of shift.

17. The gripper as set forth in claim 1, wherein the control means are arranged at least in part on or in the housing of the gripper.

18. The gripper as set forth in claim 17, adapted to perform in accordance with a manner of operation in which at least two drive pistons are able to be shifted simultaneously in the same direction.

19. The gripper as set forth in claim 1, adapted to perform in a manner of operation in which the at least two drive pistons are respectively shifted simultaneously either in mutually opposite directions or in the same direction.

20. The gripper as set forth in claim 1, designed in the form of a parallel gripper.

21. A fluid operated gripper comprising:
    a housing defining a drive space; and
    at least two drive pistons being arranged in sequence within the drive space, the at least two drive pistons being connectable with a gripping element, the at least two drive pistons being able to be shifted and positioned in the direction of their sequence in relation to the housing and in relation to one another, the at least two drive pistons dividing up the drive space into two outer actuating chambers, each outer actuating chamber delimited by one of the at least two drive pistons, and into at least one inner actuating chamber delimited simultaneously by adjacent drive pistons, the at least two drive pistons are not mechanically connected and are movable independent of each other, the individual actuating chambers being provided for mutually matching fluid action controlled by control means, and wherein the control means include position sensor means for the detection of the position of the individual drive pistons.

22. The gripper as set forth in claim 21, wherein the position sensor means comprise at least one displacement measuring system.

23. A fluid operated gripper comprising:

a housing defining a drive space; and at least two drive pistons being arranged in sequence within the drive space, the at least two drive pistons being connectable with a gripping element, the at least two pistons being able to be shifted and positioned in the direction of their sequence in relation to the housing and in relation to one another, the at least two drive pistons dividing up the drive space into two outer actuating chambers, each chamber delimited by one of the at least two drive pistons, and furthermore into at least one inner actuating chamber delimited simultaneously by adjacent drive pistons, the at least two drive pistons are not mechanically connected, the individual actuating chambers being provided for mutually matching fluid action controlled by control means, and wherein the at least two drive pistons are shiftable simultaneously in the same direction.

24. The gripper as set forth in claim 21, wherein the control means is arranged at least in part on or in the housing of the gripper.

25. A fluid operated gripper comprising:

a housing defining a drive space; and at least two drive pistons being arranged in sequence within the drive space, the at least two drive pistons being connectable with a gripping element, the at least two drive pistons being able to be shifted and positioned in the direction of their sequence in relation to the housing and in relation to one another, the at least two drive pistons dividing up the drive space into two outer actuating chambers, each outer actuating chamber delimited by one of the at least two drive pistons, and furthermore into at least one inner actuating chamber delimited simultaneously by adjacent drive pistons, the at least two drive pistons are not mechanically connected, the individual actuating chambers being provided for mutually matching fluid action controlled by control means, and wherein the at least two pistons are respectively shiftable simultaneously in mutually opposite directions and in the same direction.

\* \* \* \* \*